United States Patent
Orellana Gonzalez et al.

(10) Patent No.: US 11,665,373 B2
(45) Date of Patent: May 30, 2023

(54) VIRTUAL SPECTATOR EXPERIENCE FOR LIVE EVENTS

(71) Applicant: International Business Machines Corporation, Armonk, NY (US)

(72) Inventors: Ugo Ivan Orellana Gonzalez, Westlake Village, CA (US); Aaron K. Baughman, Cary, NC (US); Todd Russell Whitman, Bethany, CT (US); Stephen C. Hammer, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 17/301,811

(22) Filed: Apr. 15, 2021

(65) Prior Publication Data

US 2022/0337886 A1 Oct. 20, 2022

(51) Int. Cl.
*H04N 21/2187* (2011.01)
*H04N 21/233* (2011.01)
*H04N 21/442* (2011.01)
*H04N 21/214* (2011.01)

(52) U.S. Cl.
CPC ..... *H04N 21/2187* (2013.01); *H04N 21/2143* (2013.01); *H04N 21/233* (2013.01); *H04N 21/44218* (2013.01)

(58) Field of Classification Search
CPC ........... H04N 21/2187; H04N 21/2143; H04N 21/233; H04N 21/44218
See application file for complete search history.

(56) References Cited

U.S. PATENT DOCUMENTS

| | | | |
|---|---|---|---|
| 7,770,114 B2 | 8/2010 | Sriprakash et al. | |
| 8,887,069 B2 | 11/2014 | Tipirneni | |
| 10,300,394 B1 | 5/2019 | Evans et al. | |
| 2007/0244878 A1 | 10/2007 | Hulme et al. | |
| 2008/0079752 A1* | 4/2008 | Gates | G06F 3/011 345/633 |
| 2015/0281744 A1* | 10/2015 | Chapman | H04N 21/42224 725/37 |
| 2019/0262705 A1 | 8/2019 | Trombetta et al. | |

(Continued)

FOREIGN PATENT DOCUMENTS

WO WO2016154663 A1 10/2016

*Primary Examiner* — Adil Ocak
(74) *Attorney, Agent, or Firm* — Yee & Associates, P.C.

(57) ABSTRACT

A live event virtual experience is provided. Emotions of virtual spectators to a current situation occurring in a live event at a physical venue are determined from received data regarding reactions of the virtual spectators to the live event using bias detection. A historical sound clip that matches the emotions of the virtual spectators to the current situation occurring in the live event is retrieved. The historical sound clip that matches the emotions of the virtual spectators to the current situation occurring in the live event is input into a machine learning model that performs inverse bias mitigation to amplify bias and applies in-process adversarial fairness debiasing. The historical sound clip after performing the inverse bias mitigation to amplify the bias and applying the in-process adversarial fairness debiasing is converted to a standardized historical sound segment length. A sound representation is generated from the standardized historical sound segment length.

11 Claims, 6 Drawing Sheets

(56) References Cited

U.S. PATENT DOCUMENTS

| | | | |
|---|---|---|---|
| 2020/0005096 A1* | 1/2020 | Calmon | G06N 20/10 |
| 2020/0401809 A1 | 12/2020 | Chang et al. | |
| 2020/0404219 A1 | 12/2020 | Yerli | |
| 2020/0404344 A1* | 12/2020 | Bathory | H04R 27/00 |
| 2021/0008416 A1 | 1/2021 | DeCarlo | |
| 2021/0099197 A1* | 4/2021 | Wang | H04B 1/401 |
| 2021/0297779 A1* | 9/2021 | Hawke | H04R 1/403 |
| 2021/0377616 A1* | 12/2021 | Behagen | H04N 21/2365 |
| 2021/0406712 A1* | 12/2021 | Bhide | G06N 5/04 |

* cited by examiner

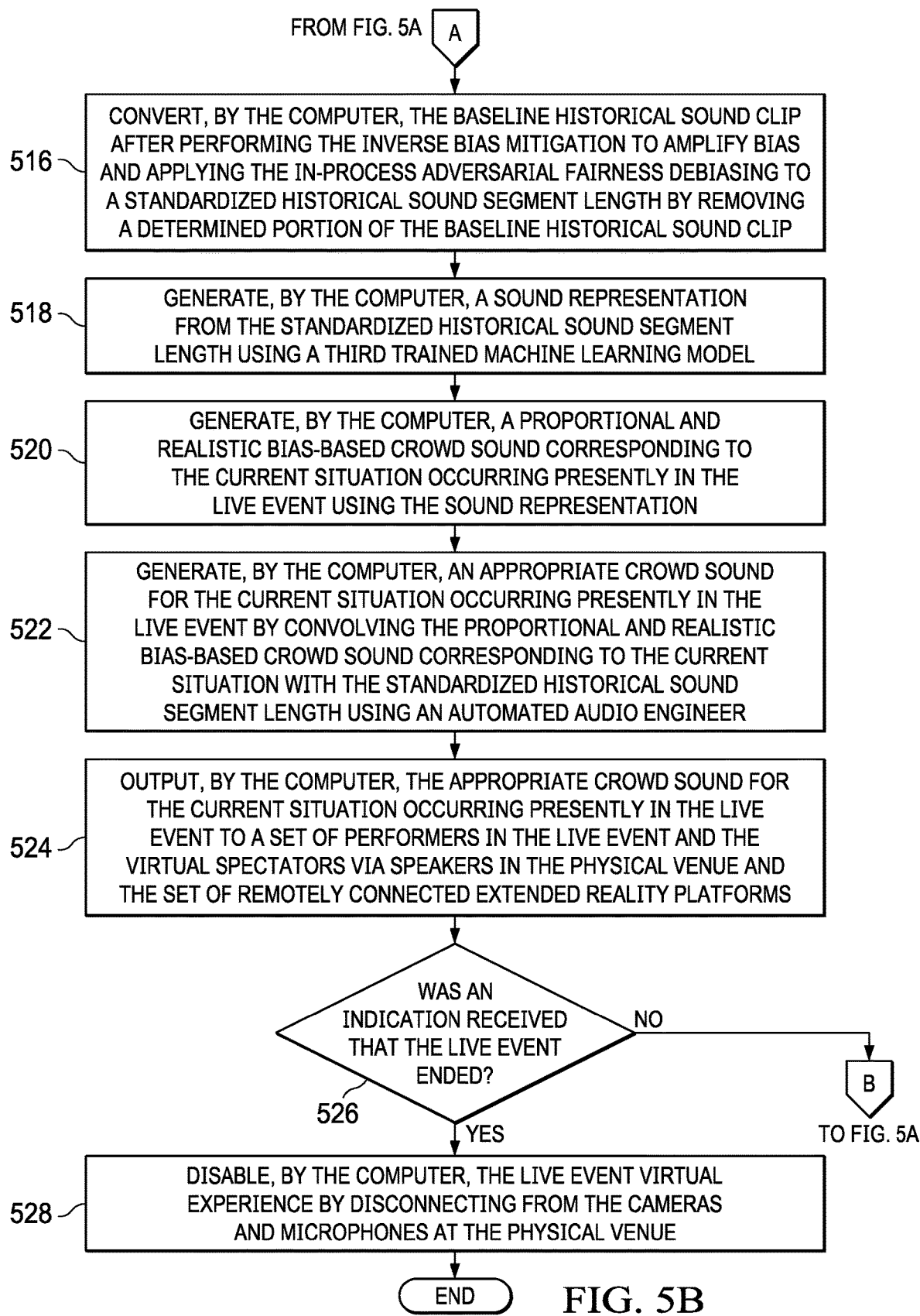

VIRTUAL SPECTATOR EXPERIENCE FOR LIVE EVENTS

BACKGROUND

1. Field

The disclosure relates generally to extended reality and more specifically to providing a virtual experience of a live event occurring at a physical venue to virtual spectators via remotely connected extended reality platforms outside the physical venue.

2. Description of the Related Art

Extended reality is a term referring to real and virtual combined environments and human-machine interactions generated by computer technology. Extended reality includes augmented reality, virtual reality, and mixed reality in combination or independently. The levels of virtuality range from partially sensory inputs to immersive virtuality. The connotation of extended reality lies in the extension of human experiences especially relating to the senses of existence, which is represented by virtual reality, and the acquisition of cognition, which is represented by augmented reality. In mixed reality, digital and real-world objects co-exist and can interact with one another in real-time. With the continuous development in human-computer interactions, extended reality continues to evolve. Extended reality can be applied in a wide range of ways, such as, for example, entertainment, marketing, real-estate, training, remote working, and the like.

SUMMARY

According to one illustrative embodiment, a computer-implemented method for providing a live event virtual experience is provided. A computer determines emotions of virtual spectators to a current situation occurring presently in a live event at a physical venue from received data regarding reactions of the virtual spectators to the live event using bias detection based on limited utility with bias labels and limited utility with large class imbalance. The computer retrieves a historical sound clip that matches the emotions of the virtual spectators to the current situation occurring presently in the live event. The computer inputs the historical sound clip that matches the emotions of the virtual spectators to the current situation occurring presently in the live event into a machine learning model that performs inverse bias mitigation to amplify bias and applies in-process adversarial fairness debiasing. The computer converts the historical sound clip after performing the inverse bias mitigation to amplify the bias and applying the in-process adversarial fairness debiasing to a standardized historical sound segment length by removing a determined portion of the historical sound clip. The computer generates a sound representation from the standardized historical sound segment length. According to other illustrative embodiments, a computer system and computer program product for providing a live event virtual experience are provided.

BRIEF DESCRIPTION OF THE DRAWINGS

FIGS. 5A-5B are a flowchart illustrating a process for providing a live event virtual experience in accordance with an illustrative embodiment.

DETAILED DESCRIPTION

Figure 1:
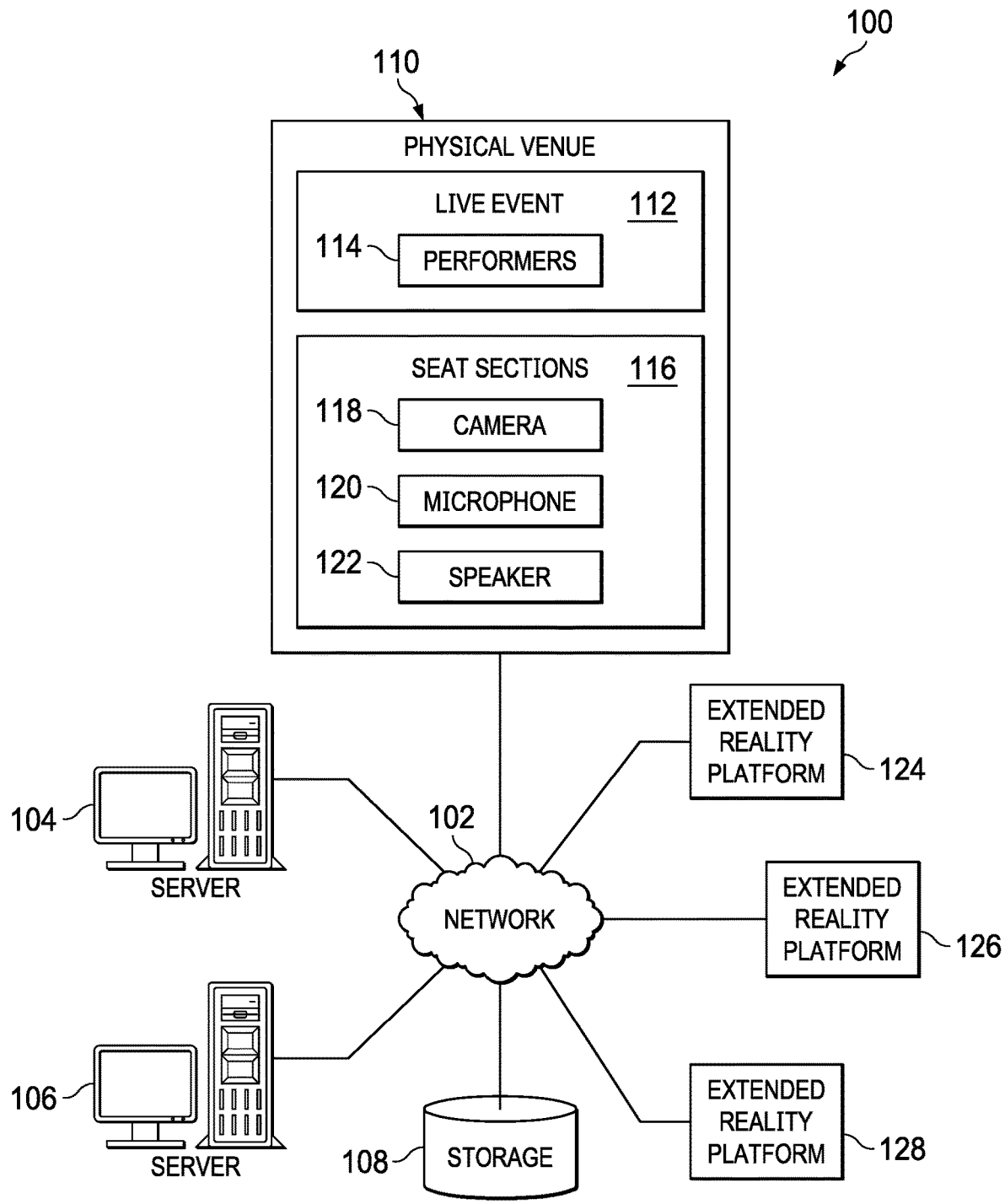
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide live event virtual experience services to client extended reality platforms. Also, it should be noted that server 104 and server 106 may each represent a cluster of servers in one or more data centers. Alternatively, server 104 and server 106 may each represent multiple computing nodes in one or more cloud environments.

Further, server 104 and server 106 can connect to physical venue 110 via network 102. It should be noted that physical venue 110 may represent a plurality of different physical venues. Physical venue 110 may be any type of site or place where live event 112 can occur. Live event 112 may be, for example, an athletic event, a concert, a play, a ballet, a circus, or the like performed by performers 114. Performers 114 represent a set of live event performers, such as, players, musicians, actors, dancers, animals, and the like.

Seat sections 116 represent a plurality of different seat sections within physical venue 110 where a spectator or attendee can purchase a seat to watch and experience live event 112 from a particular vantage point or viewing angle. Each of seat sections 116 includes camera 118, microphone 120, and speaker 122. Camera 118, microphone 120, and speaker 122 may represent a set of cameras, microphones, and speakers. Camera 118 and microphone 120 capture video (e.g., sights) and audio (e.g., sounds) of live event 112 from the vantage point of that particular seat section where camera 118 and microphone 120 are located. Speaker 122 provides audio output to performers 114 from the vantage point of that particular seat section where speaker 121 is located. It should be noted that server 104 and server 106 can connect to camera 118, microphone 120, and speaker 122 using the connection to physical venue 110 via network 102.

Extended reality platform 124, extended reality platform 126, and extended reality platform 128 also connect to network 102. Extended reality platforms 124, 126, and 128 are clients of server 104 and server 106 and are located outside of physical venue 110. Extended reality platforms 124, 126, and 128 may represent any type of extended reality device or system, such as, for example, virtual reality, augmented reality, mixed reality, or any combination thereof, with wire or wireless communication links to network 102. Also, each of extended reality platforms 124, 126, and 128 includes one or more cameras, microphones, and speakers. Users of extended reality platforms 124, 126, and 128 may utilize extended reality platforms 124, 126, and 128 to access and utilize the live event virtual experience services provided by server 104 and server 106. In other words, the users of extended reality platforms 124, 126, and 128 may utilize extended reality platforms 124, 126, and 128 to become virtual spectators of live event 112 from the vantage point of a purchased seat location within one of seat sections 116.

Server 104 and server 106 utilize the cameras and microphones of extended reality platforms 124, 126, and 128 to capture the reactions and emotions of the virtual spectators to live event 112. Server 104 and server 106 then utilize speaker 122 to output a generated crowd sound that matches the reactions and emotions of the virtual spectators to performers 114 during live event 112 in real-time. Server 104 and server 106 also utilize the speakers of extended reality platforms 124, 126, and 128 to output the generated crowd sound that matches the reactions and emotions of the other virtual spectators to each of the virtual spectators corresponding to extended reality platforms 124, 126, and 128.

Storage 108 is a network storage device capable of storing any type of data in a structured format or an unstructured format. In addition, storage 108 may represent a plurality of network storage devices. Further, storage 108 may store identifiers and network addresses for a plurality of different extended reality platforms, identifiers for a plurality of different extended reality platform users, identifiers and network addresses for a plurality of different physical venues, identifiers and network addresses for a plurality of different cameras, microphones, and speakers with the plurality of different physical venues, identifiers for a plurality of different live events, historical sound clips of a plurality of different live events, trained machine learning models, and the like. Furthermore, storage 108 may store other types of data, such as authentication or credential data that may include, for example, usernames and passwords associated with extended reality platform users.

In addition, it should be noted that network data processing system 100 may include any number of additional servers, extended reality platforms, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to extended reality platform 124 over network 102 for use on extended reality platform 124.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
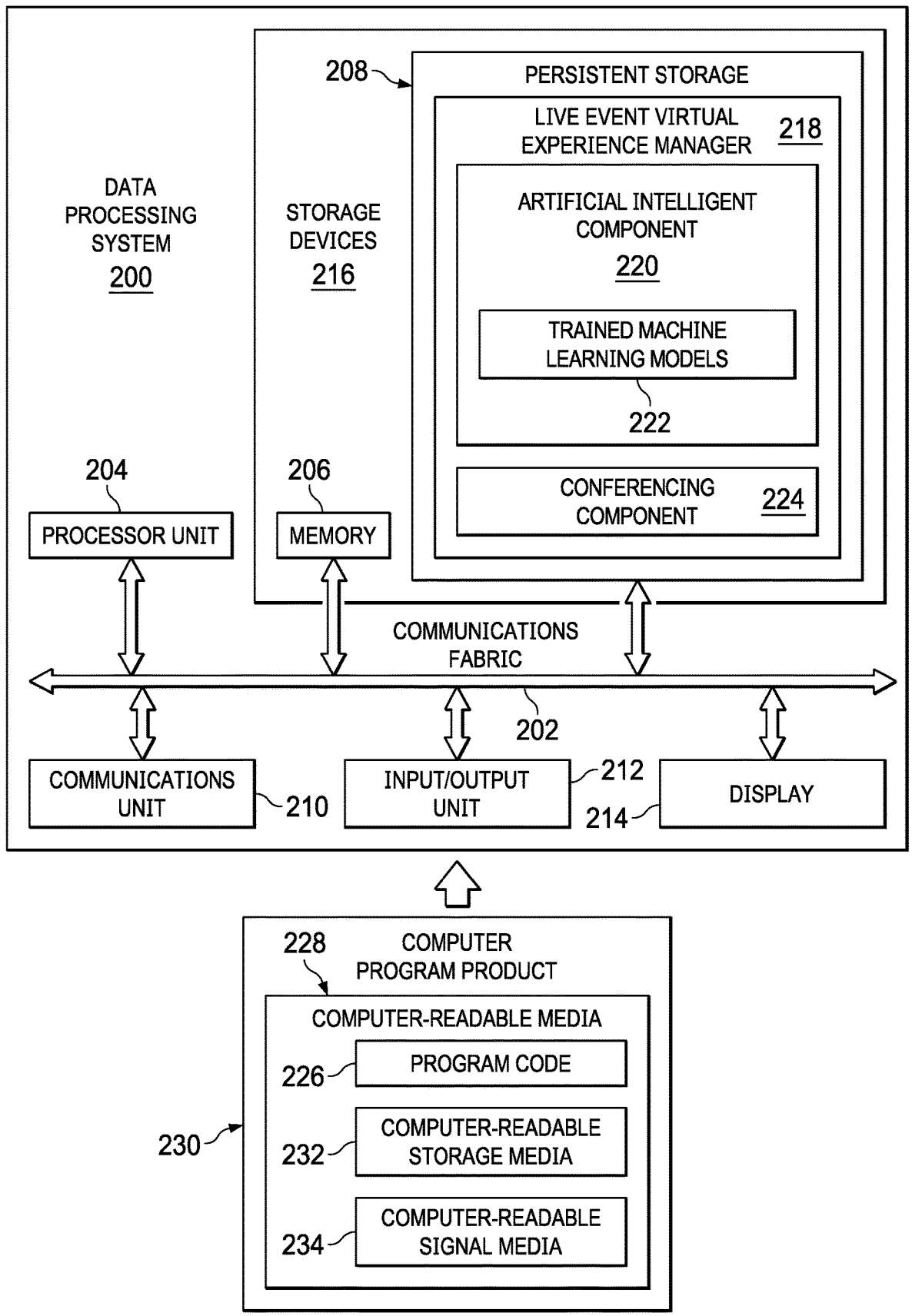
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the live event virtual experience processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores live event virtual experience manager 218. However, it should be noted that even though live event virtual experience manager 218 is illustrated as residing in persistent storage 208, in an alternative illustrative embodiment live event virtual experience manager 218 may be a separate component of data processing system 200. For example, live event virtual experience manager 218 may be a hardware component coupled to communication fabric 202 or a combination of hardware and software components. In another alternative illustrative embodiment, a first set of components of live event virtual experience manager 218 may be located in data processing system 200 and a second set of components of live event virtual experience manager 218 may be located in a second data processing system, such as, for example, server 106 in FIG. 1.

Live event virtual experience manager 218 controls the process for providing a virtual experience of a live event occurring at a physical venue to a set of virtual spectators via remotely connected extended reality platforms outside the physical venue. The live event occurring at the physical venue may be, for example, live event 112 occurring at physical venue 110 in FIG. 1. The remotely connected extended reality platforms may be, for example, extended reality platforms 124, 126, and 128, which correspond to the virtual spectators of the live event.

In this example, live event virtual experience manager 218 includes artificial intelligence component 220. Artificial intelligence component 220 includes trained machine learning models 222. Live event virtual experience manager 218 utilizes trained machine learning models 222 of artificial intelligence component 220 to perform different processes of the live event virtual experience service, such as, for example, identifying emotions or sentiment expressed by the virtual spectators to a current situation or happening during the live event, selecting and retrieving a historic sound clip of a same or similar live event that match the emotions or sentiment expressed by the virtual spectators to the current situation or happening during the live event, performing inverse bias mitigation to amplify bias, applying in-process adversarial fairness debiasing, generating a pixel-based spectrogram based on the historic sound clip, and the like.

Artificial intelligence component 220 has intelligent behavior and can be based on the function of a human brain. Artificial intelligence component 220 comprises at least one of an artificial neural network, cognitive system, Bayesian network, fuzzy logic, expert system, natural language system, or some other suitable system. Machine learning can be used to train artificial intelligence component 220. Machine learning involves inputting data to the process and allowing the process to adjust and improve the function of artificial intelligence component 220, thereby increasing the predictive accuracy of artificial intelligence component 220 and, thus, increasing the performance of data processing system 200, itself.

Trained machine learning models 222 of artificial intelligence component 220 can learn without being explicitly programmed to do so. Trained machine learning models 222 can learn based on training data input into trained machine learning models 222. Trained machine learning models 222 can learn using various types of machine learning algorithms. The machine learning algorithms include at least one of a supervised learning, unsupervised learning, feature learning, sparse dictionary learning, anomaly detection, association rules, or other types of learning algorithms. Examples of machine learning models include an artificial neural network, a decision tree, a support vector machine, a Bayesian network, a genetic algorithm, and other types of models.

Live event virtual experience manager 218 also includes conferencing component 224. Live event virtual experience manager 218 utilizes conferencing component 224 to conference together each of the remotely connected extended reality platforms with one another. Live event virtual experience manager 218 also utilizes conferencing component 224 to conference the remotely connected extended reality platforms with the physical venue where the live event is occurring. Live event virtual experience manager 218 further utilizes conferencing component 224 to combine all the data feeds for all of the cameras, microphones, and speakers within the physical venue.

As a result, data processing system 200 operates as a special purpose computer system in which live event virtual experience manager 218 in data processing system 200 enables virtual experience of a live event occurring at a physical venue to virtual spectators via remotely connected extended reality platforms. In particular, live event virtual experience manager 218 transforms data processing system 200 into a special purpose computer system as compared to currently available general computer systems that do not have live event virtual experience manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 226 is located in a functional form on computer-readable media 228 that is selectively removable and may be loaded onto or transferred to data processing system 200 for running by processor unit 204. Program code 226 and computer-readable media 228 form computer program product 230. In one example, computer-readable media 228 may be computer-readable storage media 232 or computer-readable signal media 234.

In these illustrative examples, computer-readable storage media 232 is a physical or tangible storage device used to store program code 226 rather than a medium that propagates or transmits program code 226. Computer-readable storage media 232 may include, for example, an optical or magnetic disc that is inserted or placed into a drive or other device that is part of persistent storage 208 for transfer onto a storage device, such as a hard drive, that is part of persistent storage 208. Computer-readable storage media 232 also may take the form of a persistent storage, such as a hard drive, a thumb drive, or a flash memory that is connected to data processing system 200.

Alternatively, program code 226 may be transferred to data processing system 200 using computer-readable signal media 234. Computer-readable signal media 234 may be, for example, a propagated data signal containing program code 226. For example, computer-readable signal media 234 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 228" can be singular or plural. For example, program code 226 can be located in computer-readable media 228 in the form of a single storage device or system. In another example, program code 226 can be located in computer-readable media 228 that is distributed in multiple data processing systems. In other words, some instructions in program code 226 can be located in one data processing system while other instructions in program code 226 can be located in one or more other data processing systems. For example, a portion of program code 226 can be located in computer-readable media 228 in a server computer while another portion of program code 226 can be located in computer-readable media 228 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 226.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Illustrative embodiments utilize live feeds of a live event from video cameras, which are located in different seat sections inside a physical live event venue, as input. The live event may be any type of live event, such as, for example, a sporting event, a music concert, a theatrical play, or the like. Each respective virtual spectator or virtual attendee of the live event utilizes a corresponding extended reality platform to receive a particular live feed to experience the live event from a vantage point of a camera and microphone positioned in a seat section where a particular virtual spectator purchased a seat location within the physical venue of the live event. In addition, a virtual spectator has an option to connect with other virtual spectators to interact on the live event that each of the virtual spectators is watching via a corresponding extended reality platform.

Illustrative embodiments utilize artificial intelligence (e.g., a set of trained machine learning models) to select historic sound clips of same or similar previous live events that correspond to the current situation, circumstance, happening, or action of the live event. Illustrative embodiments also utilize microphones in the seat section where the virtual spectator purchased a seat to capture crowd sounds at the live event to feed to the speakers of the virtual spectator's extended reality platform to enhance the feeling of the virtual spectator actually being present at the live event. In addition, illustrative embodiments, using speakers located in the different seat sections inside the physical venue of the live event, amplify the sounds made by the virtual spectators to the live event performers, such as, for example, players, musicians, actors, dancers, or the like.

Illustrative embodiments output simulated proportional and realistic virtual spectators' emotions toward the live event performers based on the number of connected virtual spectators. Illustrative embodiments utilize trained machine learning models to identify the emotions or sentiment of the virtual spectators (e.g., reactions, such as cheers, jeers, applause, gasps, body movements, hand gestures, facial expressions, and the like, of the virtual spectators to the current situation occurring presently at the live event). Illustrative embodiments select a recorded historic sound clip that matches or substantially matches the current situation at the live event to amplify bias based on crowd and individual bias. For example, two different groups of virtual spectators corresponding to two opposing teams may both cheer and jeer at a particular point in time (e.g., when a foul is called) during the live event. Illustrative embodiments utilize inverse bias mitigation to amplify bias. Illustrative embodiments may remove or delete a first portion (e.g., a determined number of seconds) of the recorded historical sound clip to generate a standardized historical sound segment length corresponding to the current situation. Illustrative embodiments input the recorded historic sound clip into a trained machine learning model to generate a pixel-based spectrogram for the rest of the live event crowd sound or noise. The generated pixel-based spectrogram delineates sound bias of the virtual spectators. Illustrative embodiments generate appropriate crowd sounds expressing the emotions of the virtual spectators to the current situation at the live event using the pixel-based spectrogram of the recorded historic sound clip that matches the current situation. Illustrative embodiments output the generated scene appropriate crowd noises on speakers in the different seat sections at the physical venue to the performers of the live event.

Illustrative embodiments also provide a performer interface enables a performer of the live event at the physical venue to at least one of gesture, glance, or say words in a direction of a holographic avatar representing a particular virtual spectator or group of virtual spectators at the live event in the physical venue. The performers directional focus changes the machine learning model that interprets the virtual spectator's emotion or reaction. If the holographic avatar receives increased attention or interaction from the performer, then illustrative embodiments decrease the threshold for excitement level from the virtual spectator.

Thus, illustrative embodiments enable two-way, real-time interaction and feedback between the virtual spectators and live event performers. Therefore, illustrative embodiments provide one or more technical solutions that overcome a technical problem with providing a virtual experience of a live event to virtual spectators via remotely connected extended reality platforms. As a result, these one or more technical solutions provide a technical effect and practical application in the field of extended reality.

Figure 3:
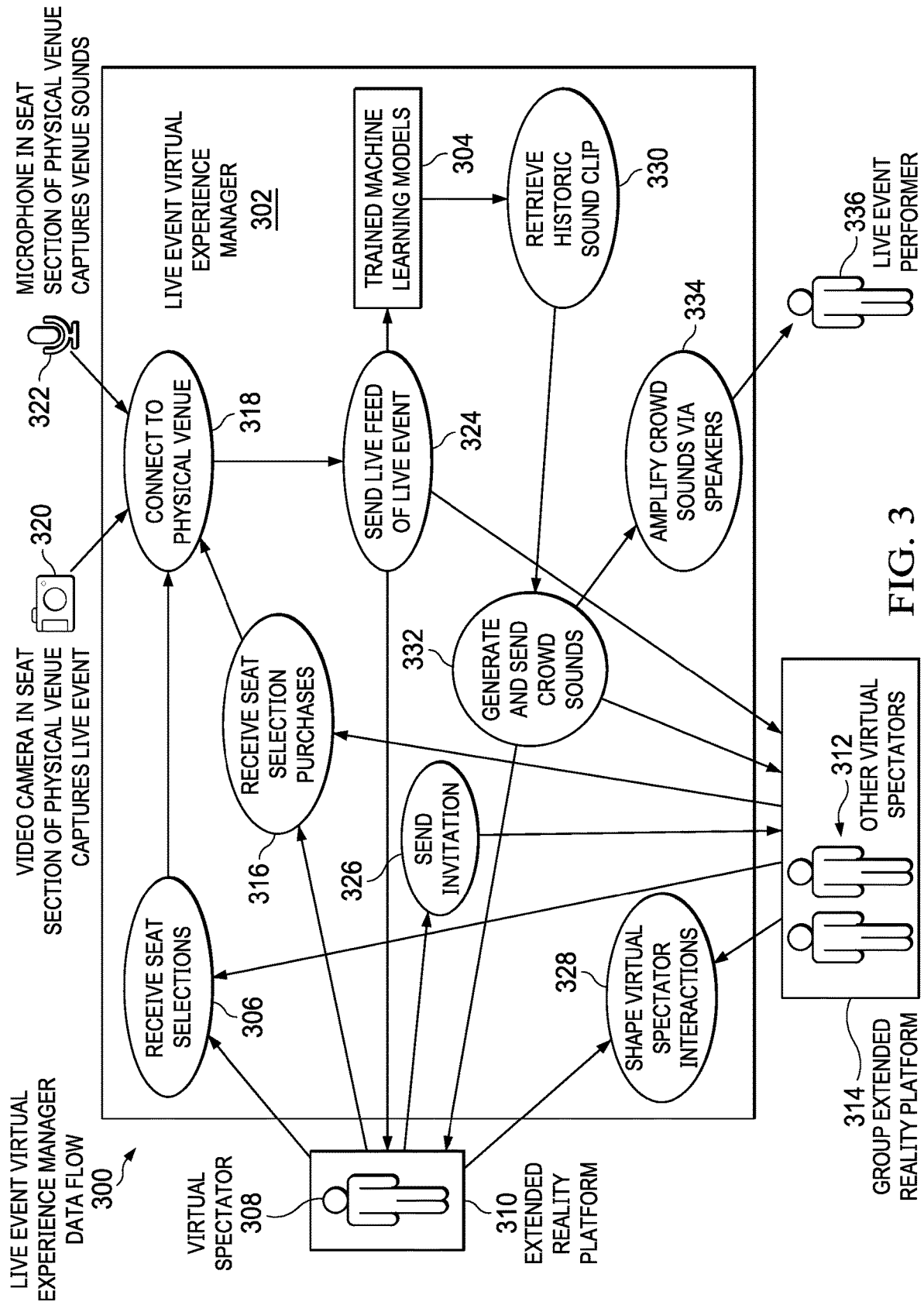
FIG. 3 is a diagram illustrating an example of a data flow for a live event virtual experience manager in accordance with an illustrative embodiment.

With reference now to FIG. 3, a diagram illustrating an example of a data flow for a live event virtual experience manager is depicted in accordance with an illustrative embodiment. Live event virtual experience manager data flow 300 is implemented in live event virtual experience manager 302, such as, for example, live event virtual experience manager 218 of data processing system 200 in FIG. 2.

In this example, live event virtual experience manager 302 includes trained machine learning models 304. Trained machine learning models 304 may be, for example, trained machine learning models 222 in FIG. 2.

At 306, live event virtual experience manager 302 receives seat location selections within a physical venue of a live event from virtual spectator 308 via extended reality platform 310 and other virtual spectators 312 via group extended reality platform 314. The physical venue of the live event may be, for example, physical venue 110 of live event 112. Extended reality platform 310 and group extended reality platform 314 may be, for example, extended reality platform 124 and extended reality platform 126 in FIG. 1. In addition, at 316, live event virtual experience manager 302 receives purchase of the seat location selections by virtual spectator 308 and other virtual spectators 312.

At 318, when live event virtual experience manager 302 receives an indication that the live event has started, live event virtual experience manager 302 connects to the physical venue of the live event. Video camera 320 in seat section corresponding to the purchased seat locations of virtual spectator 308 and other virtual spectators 312 captures sights of the live event from that vantage point or viewing angle. Video camera 320 may be, for example, camera 118 in FIG. 1. Further, microphone 322 in seat section corresponding to the purchased seat locations of virtual spectator 308 and other virtual spectators 312 captures venue noise from that vantage point. Microphone 322 may be, for example, microphone 120 in FIG. 1.

At 324, live event virtual experience manager 302 sends a live feed, which contains the images captured by video camera 320 and venue sounds captured by microphone 322, to trained machine learning models 304, virtual spectator 308 via extended reality platform 310, and other virtual spectators 312 via group extended reality platform 314. In addition, at 326, virtual spectator 308 sends an invitation to other virtual spectators 312 to interact on the live event. If other virtual spectators 312 accept the invitation from virtual spectator 308, then, at 328, live event virtual experience manager 302 shares the virtual spectator interactions on the live event. Further, at 330, trained machine learning models 304 retrieves a historical sound clip recorded from a same or similar past live event that matches a current situation occurring in the live feed of the current live event and the virtual spectator interactions and emotions regarding the current situation.

Furthermore, at 332, live event virtual experience manager 302 generates proportional and realistic crowd sounds based on the historic sound clip and the virtual spectator interactions and emotions regarding the current situation in the live event and sends the generated crowd sounds to virtual spectator 308 and other virtual spectators 312. Moreover, at 334, live event virtual experience manager 302 amplifies the generated crowd sounds via speakers in the physical venue to live event performer 336. Live event performer 336 represents a set of performers, such as, for example, performers 114 in FIG. 1, corresponding to the live event currently occurring at the physical venue.

Figure 4:
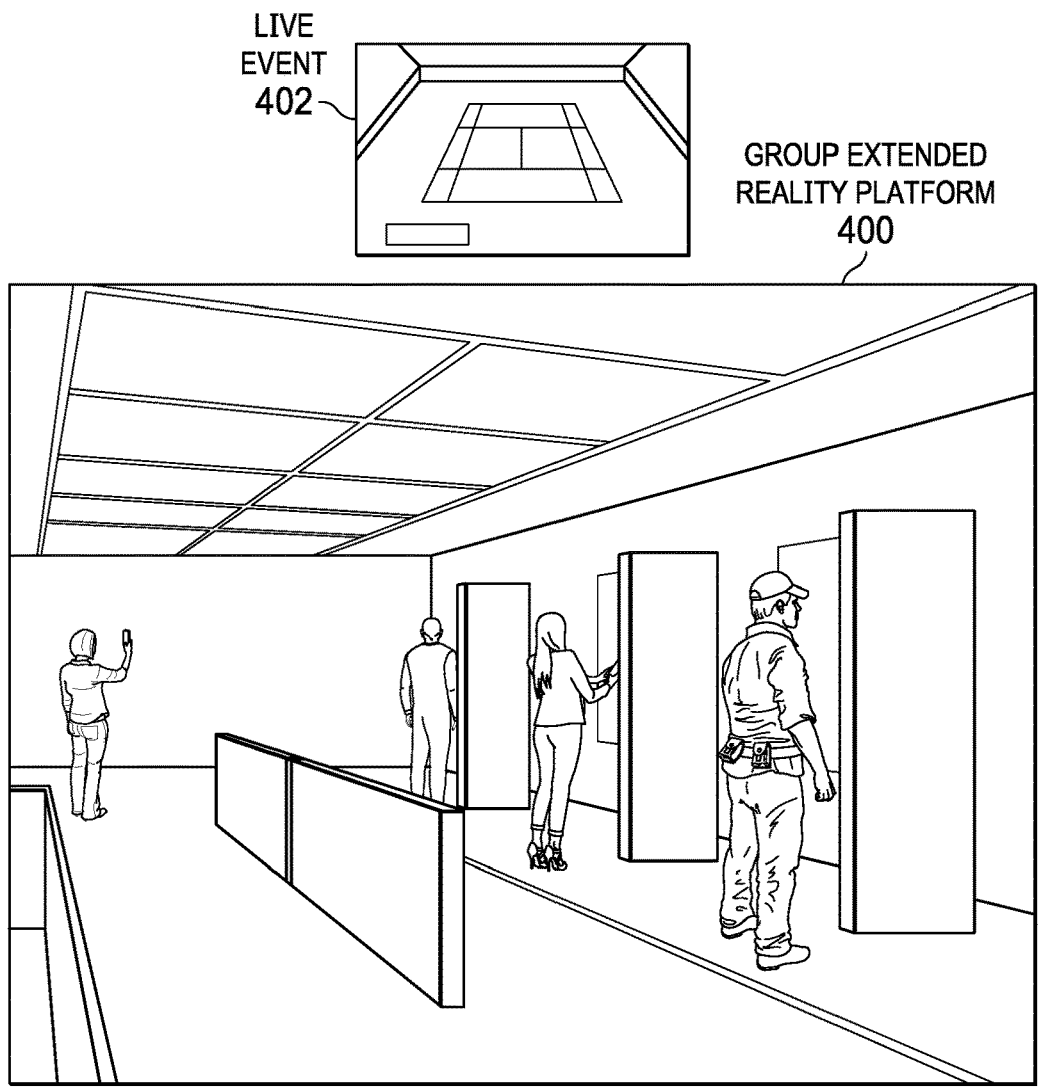
FIG. 4 is a diagram illustrating an example of a group extended reality platform in accordance with an illustrative embodiment.
Figure 4:
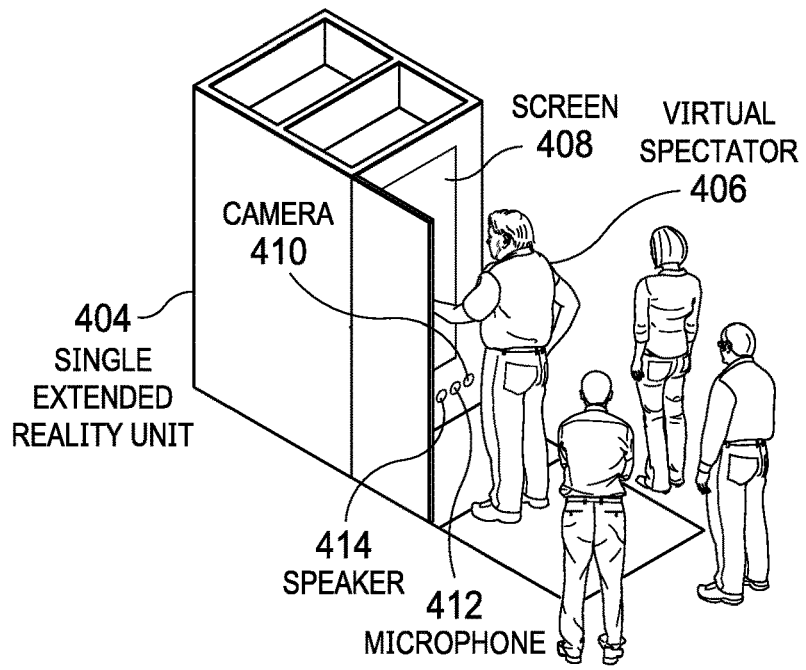

With reference now to FIG. 4, a diagram illustrating an example of a group extended reality platform is depicted in accordance with an illustrative embodiment. Group extended reality platform 400 may be, for example, group extended reality platform 314 in FIG. 3. Group extended reality platform 400 represents a remotely connected extended reality platform that can accommodate a plurality of virtual spectators to live event 402. Live event 402 may be, for example, live event 112 occurring in physical venue 110 in FIG. 1. In this example, live event 402 is a tennis match occurring in a tennis stadium. However, it should be noted that live event 402 is intended as an example only and not as a limitation on illustrative embodiments. In other words, live event 402 may represent any type of live event occurring in any type of physical venue.

Group extended reality platform 400 is comprised of a plurality of single extended reality units, such as single extended reality unit 404. Single extended reality unit 404 enables virtual spectator 406 to experience live event 402 and interact with other remotely connected virtual spectators and live event performers. Single extended reality unit 404 is comprised of screen 408, camera 410, microphone 412, and speaker 414. Virtual spectator 406 watches live event 402 on screen 408.

A live event virtual experience manager of illustrative embodiments, such as, for example, live event virtual experience manager 218 in FIG. 2 or live event virtual experience manager 302 in FIG. 3, enables "fan experience" to remotely connected virtual spectators to live event 402 by combining a plurality of camera, microphone, and speaker inputs within the physical venue of live event 402 using a conferencing component, such as, for example, conferencing component 224 in FIG. 2. The fan experience is based on purchased seat location within the physical venue. Illustrative embodiments provide real-time interactions and virtual experiences to both virtual spectators, such as virtual spectator 406, and the performers of live event 402.

Virtual spectator 406 selects and purchases a seat location within the physical venue of live event 402. Thus, virtual spectator 406 has access to a vantage point or viewing angle corresponding to the purchased seat location within the physical venue via a set of cameras within the physical venue corresponding to the purchased seat location. The live event virtual experience manager can also generate a hologram, represented by an avatar, of virtual spectator 406 in the purchased seat location. However, it should be noted that the holographic avatar may represent a group of virtual spectators. The closer the holographic avatar of virtual spectator 406 is to a performer of live event 402 (e.g., courtside seat location), the more noticeable virtual spectator 406 will be to the performer. The live event virtual experience manager is able to capture reactions and emotions (e.g., facial expressions, gestures, body movements, utterances, biometrics, and the like) of virtual spectator 406 to a current situation of live event 402 (e.g., service ace, challenged line call, player injury, match point, or the like) utilizing received data feeds from camera 410 and microphone 412 of single extended reality unit 404. The live event virtual experience manager generates proportional and realistic crowd sounds based on captured reactions and emotions corresponding to the number of virtual spectators experiencing live event 402 and outputs the generated crowd sound via speakers to both the live event performers and the number of virtual spectators.

Figure 5A:
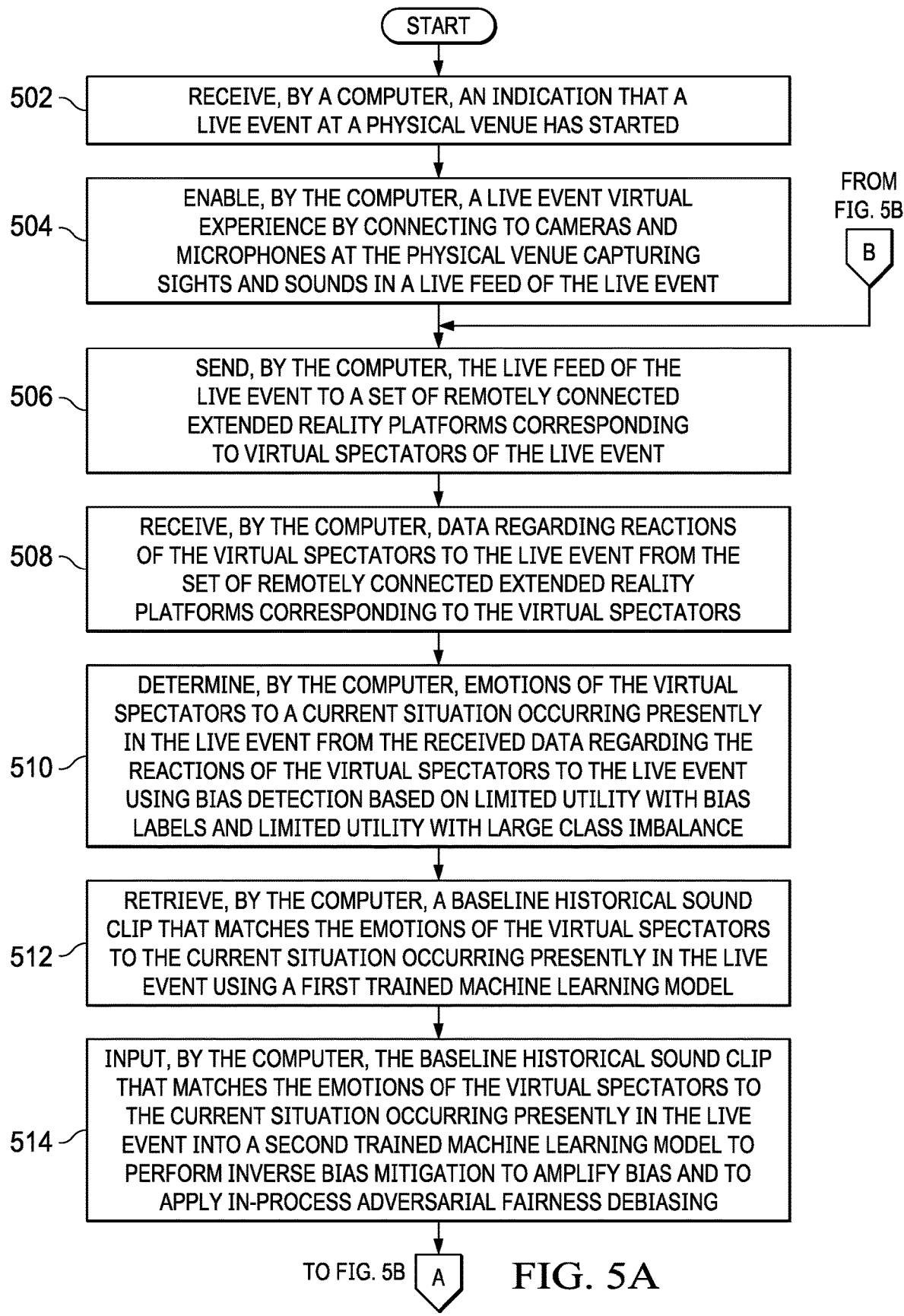

With reference now to FIGS. 5A-5B, a flowchart illustrating a process for providing a live event virtual experience is shown in accordance with an illustrative embodiment. The process shown in FIGS. 5A-5B may be implemented in a computer, such as, for example, server 104 in FIG. 1 or data processing system 200 in FIG. 2. For example, the process shown in FIGS. 5A-5B may be implemented in live event virtual experience manager 218 in FIG. 2.

The process begins when the computer receives an indication that a live event at a physical venue has started (step 502). In response to receiving the indication that the live event has started, the computer enables a live event virtual experience by connecting to cameras and microphones at the physical venue capturing sights and sounds in a live feed of the live event (step 504). In addition, the computer sends the live feed of the live event to a set of remotely connected extended reality platforms corresponding to virtual spectators of the live event (step 506).

Subsequently, the computer receives data regarding reactions of the virtual spectators to the live event from the set of remotely connected extended reality platforms corresponding to the virtual spectators (step 508). The computer receives the data regarding the reactions of the virtual spectators to the live event from cameras and microphones associated with the set of remotely connected extended reality platforms. The computer determines emotions of the virtual spectators to a current situation occurring presently in the live event from the received data regarding the reactions of the virtual spectators to the live event using bias detection based on limited utility with bias labels and limited utility with large class imbalance (step 510).

Afterward, the computer retrieves from storage a baseline historical sound clip that matches the emotions of the virtual spectators to the current situation occurring presently in the live event using a first trained machine learning model (step 512). The computer inputs the baseline historical sound clip that matches the emotions of the virtual spectators to the current situation occurring presently in the live event into a second trained machine learning model that performs inverse bias mitigation to amplify bias and applies in-process adversarial fairness debiasing (step 514). Further, the computer converts the baseline historical sound clip after performing the inverse bias mitigation to amplify the bias and applying the in-process adversarial fairness debiasing to a standardized historical sound segment length by removing a determined portion of the baseline historical sound clip (step 516).

Then, the computer generates a sound representation from the standardized historical sound segment length using a third trained machine learning model (step 518). The sound representation may be, for example, a pixel-based spectrogram or another signal representation. Furthermore, the computer generates a proportional and realistic bias-based crowd sound corresponding to the current situation occurring presently in the live event using the sound representation (step 520). Moreover, the computer generates an appropriate crowd sound for the current situation occurring presently in the live event by convolving the proportional and realistic bias-based crowd sound corresponding to the current situation with the standardized historical sound segment length using an automated audio engineer (step 522). Subsequently, the computer outputs the appropriate crowd sound for the current situation occurring presently in the live event to a set of performers in the live event and the virtual spectators via speakers in the physical venue and the set of remotely connected extended reality platforms (step 524).

Afterward, the computer makes a determination as to whether an indication was received that the live event ended (step 526). If the computer determines that an indication was not received that the live event ended, no output of step 526, then the process returns to step 506 where the computer continues to send the live feed of the live event to the set of remotely connected virtual reality platforms corresponding to the virtual spectators. If the computer determines that an indication was received that the live event ended, yes output of step 526, then the computer disables the live event virtual experience by disconnecting from the cameras and microphones at the physical venue (step 528). Thereafter, the process terminates.

Thus, illustrative embodiments of the present invention provide a computer-implemented method, computer system, and computer program product for providing a virtual experience of a live event occurring at a physical venue to virtual spectators via remotely connected extended reality platforms outside the physical venue. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for providing a live event virtual experience, the computer-implemented method comprising:

determining, by a computer, emotions of virtual spectators to a current situation occurring presently in a live event at a physical venue from received data regarding reactions of the virtual spectators to the live event using bias detection based on limited utility with bias labels and limited utility with large class imbalance;

retrieving, by the computer, a historical sound clip that matches the emotions of the virtual spectators to the current situation occurring presently in the live event;

inputting, by the computer, the historical sound clip that matches the emotions of the virtual spectators to the current situation occurring presently in the live event into a machine learning model that performs inverse bias mitigation to amplify bias and applies in-process adversarial fairness debiasing;

converting, by the computer, the historical sound clip after performing the inverse bias mitigation to amplify the bias and applying the in-process adversarial fairness debiasing to a standardized historical sound segment length by removing a determined portion of the historical sound clip;

generating, by the computer, a sound representation from the standardized historical sound segment length corresponding to the emotions of the virtual spectators to the current situation occurring presently in the live event determined from the received data regarding the reactions of the virtual spectators to the live event at the physical venue;

generating, by the computer, a proportional and realistic bias-based crowd sound corresponding to the current situation occurring presently in the live event using the sound representation;

generating, by the computer, an appropriate crowd sound for the current situation occurring presently in the live event by convolving the proportional and realistic bias-based crowd sound corresponding to the current situation occurring presently in the live event using the sound representation with the standardized historical sound segment length; and outputting, by the computer, the appropriate crowd sound for the current situation occurring presently in the live event to a set of performers in the live event and the virtual spectators via speakers in the physical venue of the live event and a set of remotely connected extended reality platforms corresponding to the virtual spectators.

2. The computer-implemented method of claim 1 further comprising:

receiving, by the computer, an indication that the live event at the physical venue has started; and enabling, by the computer, the live event virtual experience by connecting to cameras and microphones at the physical venue capturing a live feed of the live event.

3. The computer-implemented method of claim 2 further comprising:

sending, by the computer, the live feed of the live event to a set of remotely connected extended reality platforms corresponding to the virtual spectators of the live event; and receiving, by the computer, data regarding the reactions of the virtual spectators to the live event from the set of remotely connected extended reality platforms corresponding to the virtual spectators.

4. The computer-implemented method of claim 1, wherein each respective virtual spectator of the live event utilizes a corresponding extended reality platform to receive a particular live feed to experience the live event from a vantage point of a camera and microphone positioned in a seat section where a particular virtual spectator purchased a seat location within the physical venue of the live event.

5. The computer-implemented method of claim 1, wherein a performer interface enables a performer of the live event at the physical venue to at least one of gesture, glance, or say words in a direction of a holographic avatar representing a particular virtual spectator at the live event in the physical venue.

6. A computer system for providing a live event virtual experience, the computer system comprising:

a bus system;

a storage device connected to the bus system, wherein the storage device stores program instructions; and a processor connected to the bus system, wherein the processor executes the program instructions to:

determine emotions of virtual spectators to a current situation occurring presently in a live event at a physical venue from received data regarding reactions of the virtual spectators to the live event using bias detection based on limited utility with bias labels and limited utility with large class imbalance;

retrieve a historical sound clip that matches the emotions of the virtual spectators to the current situation occurring presently in the live event;

input the historical sound clip that matches the emotions of the virtual spectators to the current situation occurring presently in the live event into a machine learning model that performs inverse bias mitigation to amplify bias and applies in-process adversarial fairness debiasing;

convert the historical sound clip after performing the inverse bias mitigation to amplify the bias and applying the in-process adversarial fairness debiasing to a standardized historical sound segment length by removing a determined portion of the historical sound clip;

generate a sound representation from the standardized historical sound segment length corresponding to the emotions of the virtual spectators to the current situation occurring presently in the live event determined from the received data regarding the reactions of the virtual spectators to the live event at the physical venue;

generate a proportional and realistic bias-based crowd sound corresponding to the current situation occurring presently in the live event using the sound representation;

generate an appropriate crowd sound for the current situation occurring presently in the live event by convolving the proportional and realistic bias-based crowd sound corresponding to the current situation with the standardized historical sound segment length; and output the appropriate crowd sound for the current situation occurring presently in the live event to a set of performers in the live event and the virtual spectators via speakers in the physical venue of the live event and a set of remotely connected extended reality platforms corresponding to the virtual spectators.

7. The computer system of claim 6, wherein the processor further executes the program instructions to:

receive an indication that the live event at the physical venue has started; and enable the live event virtual experience by connecting to cameras and microphones at the physical venue capturing a live feed of the live event.

8. The computer system of claim 7, wherein the processor further executes the program instructions to:

send the live feed of the live event to a set of remotely connected extended reality platforms corresponding to the virtual spectators of the live event; and receive data regarding the reactions of the virtual spectators to the live event from the set of remotely connected extended reality platforms corresponding to the virtual spectators.

9. A computer program product for providing a live event virtual experience, the computer program product comprising a computer-readable storage medium having program instructions embodied therewith, the program instructions executable by a computer to cause the computer to perform a method of:

determining, by the computer, emotions of virtual spectators to a current situation occurring presently in a live event at a physical venue from received data regarding reactions of the virtual spectators to the live event using bias detection based on limited utility with bias labels and limited utility with large class imbalance;

retrieving, by the computer, a historical sound clip that matches the emotions of the virtual spectators to the current situation occurring presently in the live event;

inputting, by the computer, the historical sound clip that matches the emotions of the virtual spectators to the current situation occurring presently in the live event into a machine learning model that performs inverse bias mitigation to amplify bias and applies in-process adversarial fairness debiasing;

converting, by the computer, the historical sound clip after performing the inverse bias mitigation to amplify the bias and applying the in-process adversarial fairness debiasing to a standardized historical sound segment length by removing a determined portion of the historical sound clip;

generating, by the computer, a sound representation from the standardized historical sound segment length corresponding to the emotions of the virtual spectators to the current situation occurring presently in the live event determined from the received data regarding the reactions of the virtual spectators to the live event at the physical venue;

generating, by the computer, a proportional and realistic bias-based crowd sound corresponding to the current situation occurring presently in the live event using the sound representation;

generating, by the computer, an appropriate crowd sound for the current situation occurring presently in the live event by convolving the proportional and realistic bias-based crowd sound corresponding to the current situation occurring presently in the live event using the sound representation with the standardized historical sound segment length; and outputting, by the computer, the appropriate crowd sound for the current situation occurring presently in the live event to a set of performers in the live event and the virtual spectators via speakers in the physical venue of the live event and a set of remotely connected extended reality platforms corresponding to the virtual spectators.

10. The computer program product of claim 9 further comprising:

receiving, by the computer, an indication that the live event at the physical venue has started; and enabling, by the computer, the live event virtual experience by connecting to cameras and microphones at the physical venue capturing a live feed of the live event.

11. The computer program product of claim 10 further comprising:

sending, by the computer, the live feed of the live event to a set of remotely connected extended reality platforms corresponding to the virtual spectators of the live event; and receiving, by the computer, data regarding the reactions of the virtual spectators to the live event from the set of remotely connected extended reality platforms corresponding to the virtual spectators.

* * * * *